United States Patent
Cinaqui Pereira et al.

(10) Patent No.: US 12,166,754 B2
(45) Date of Patent: *Dec. 10, 2024

(54) COMPUTER-IMPLEMENTED METHOD TO SECURE INTERACTIONS BETWEEN AT LEAST TWO USERS IN A NETWORK

(71) Applicant: Robert Bosch GmbH, Stuttgart (DE)

(72) Inventors: Claudio Cinaqui Pereira, Filderstadt (DE); Sibel Tezelli-Yilmaz, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 274 days.

This patent is subject to a terminal disclaimer.

(21) Appl. No.: 17/629,337

(22) PCT Filed: Jun. 24, 2020

(86) PCT No.: PCT/EP2020/067719
§ 371 (c)(1),
(2) Date: Jan. 21, 2022

(87) PCT Pub. No.: WO2021/013458
PCT Pub. Date: Jan. 28, 2021

(65) Prior Publication Data
US 2022/0255927 A1  Aug. 11, 2022

(30) Foreign Application Priority Data

Jul. 24, 2019  (EP) .................................... 19187995

(51) Int. Cl.
*H04L 9/40* (2022.01)
*H04L 9/32* (2006.01)

(52) U.S. Cl.
CPC ........ *H04L 63/0861* (2013.01); *H04L 9/3231* (2013.01)

(58) Field of Classification Search
CPC . H04L 63/0861; H04L 9/3231; H04L 9/3239; H04L 9/50; H04L 63/0428; H04L 63/08; G06F 21/32; G06F 21/64
See application file for complete search history.

(56) References Cited

U.S. PATENT DOCUMENTS 9,992,022 B1    6/2018  Chapman et al.
10,826,703 B1 * 11/2020  Shipley ............... G06F 16/1805
(Continued)

FOREIGN PATENT DOCUMENTS

| | | |
|---|---|---|
| CA | 2565894 A1 | 4/2007 |
| CN | 104798076 A | 7/2015 |
| WO | 2020035544 A1 | 2/2020 |

OTHER PUBLICATIONS

International Search Report for PCT/EP2020/067719 Issued Aug. 10, 2020.

(Continued)

*Primary Examiner* — Michael R Vaughan
(74) *Attorney, Agent, or Firm* — NORTON ROSE FULBRIGHT US LLP; Gerard A. Messina

(57) ABSTRACT

A computer-implemented method to secure an interaction between at least two users in a network, whereas at least two network nodes are connected via the network. The method includes: a first user connects to the network via a first of the two network nodes, the first user creates in the network a first identity corresponding to the first user via a software application running on the first network node, whereas the creation includes the first user providing first biometric information characterizing the first user, the first biometric information is stored in encrypted form by a computer-implemented identity management system, a second user accesses the network via a second network node, the second user requests via the network consent of the first user, whereas the request is sent via the identity management (Continued)

system, the first user denies or approves the request of the second user via the software application.

9 Claims, 3 Drawing Sheets

(56) References Cited

U.S. PATENT DOCUMENTS

| | | | | |
|---|---|---|---|---|
| 11,334,882 | B1* | 5/2022 | Jameson | H04L 9/3231 |
| 2008/0289020 | A1* | 11/2008 | Cameron | H04L 9/3247 |
| | | | | 726/9 |
| 2017/0300912 | A1* | 10/2017 | Narasimhan | H04L 63/08 |
| 2018/0048461 | A1* | 2/2018 | Jutla | H04L 9/3268 |
| 2018/0060496 | A1 | 3/2018 | Bulleit et al. | |
| 2018/0248699 | A1 | 8/2018 | Andrade | |
| 2019/0197815 | A1* | 6/2019 | Kamal | H04L 63/0861 |
| 2020/0334930 | A1* | 10/2020 | Masood | G07C 9/257 |
| 2022/0255748 | A1* | 8/2022 | Cinaqui Pereira | H04L 9/0891 |
| 2022/0321542 | A1* | 10/2022 | Cinaqui Pereira | H04L 63/0428 |
| 2023/0080322 | A1* | 3/2023 | Smith | H04L 63/06 |
| | | | | 726/7 |

OTHER PUBLICATIONS

Paul Dunphy and Fabien A.P. Petitcolas, "A First Look at Identity Management Schemes on the Blockchain" IEEE Security and Privacy (vol. 16, Issue: 4, Jul./Aug. 2018). Retrieved from the Internet on Jan. 21, 2022: https://https://arxiv.org/abs/1801.03294, 17 Pages.

* cited by examiner

COMPUTER-IMPLEMENTED METHOD TO SECURE INTERACTIONS BETWEEN AT LEAST TWO USERS IN A NETWORK

The present invention relates to a computer-implemented method to secure interactions between at least two users in a network as well as corresponding computer programs.

BACKGROUND INFORMATION

An overview over selected proposed identity management systems as well as over remaining technical challenges can be found in "A First Look at Identity Management Schemes on the Blockchain" by Paul Dunphy and Fabien A. P. Petitcolas in: IEEE Security & Privacy (Volume: 16, Issue: 4, July/August 2018).

The Hyperledger projects provide tools, libraries, and reusable components for providing digital identities rooted on blockchains or other distributed ledgers so that they are interoperable across administrative domains, applications, and any other silo. Examples include Indy, Ursa, Aries and Transact, whereas the latter enables smart contracts.

SUMMARY

In accordance with the present invention, a computer-implemented method is provided to secure an interaction between at least two users or their respective network nodes in a network, whereas the at least two network nodes are connected via the network. In accordance with an example embodiment of the present invention, a first user connects to the network via a first of the two network nodes. In a preferred embodiment of the present invention, this first node may be implemented as a smart personal device like a smartphone, personal computer, tablet or similar devices.

The first user creates in the network a first identity corresponding to the first user via a software application running on the first network node, whereas the creation includes the first user providing first biometric information characterizing the first user, especially to the software application running on the first network node. The first biometric information may, for example, include at least one of an iris sample, a fingerprint sample, a palm veins sample, a specific gesture, or a voice sample of the first user.

The first biometric information is stored in encrypted form by a computer-implemented identity management system. The computer-implemented identity management system is a system comprising at least one processor unit, at least one memory unit as well as at least one network interface to connect the system with the network and is adapted to write and read digital data representing digital identities to the memory unit. In a preferred embodiment, it is also adapted to write, read and alter information stored together with the digital identity.

A second user accesses the network via a second network node and requests via the network a consent of the first user to
  the second user accessing secret information of the first user, or
  the second user sending information to the first user, or
  the first identity corresponding to the first user being connected with a second identity corresponding to the second user, or
  the second user being granted access to control a software application assigned to the first identity,
  whereas the request is sent via the identity management system.

The first user denies or approves the request of the second user via the software application.

Such a system enables a decentralized and secure creation of digital identities whereas the creation and management of a personal identity corresponding to a human user is strictly limited to this user and secured by personal identity characteristics. The access via a software application running on a personal smart device allows this system to create and manage the digital identity in a user-friendly way while still keeping the creation and management secure and trustworthy.

In a preferred embodiment of the present invention, such a management of digital identities includes methods, where the first user authenticates to the identity management system by providing the first biometric information via the software application and whereas after the authentication, the first user alters the first identity or information stored with the first identity corresponding to the first user via a software application running on the first network node. The altering includes adding or removing further biometric information corresponding to the first user, or adding or removing secret information, or adding or removing a certificate. Additionally or alternatively, in order to deny or approve the request, the first user authenticates to the identity management system by again providing via the software application the first biometric information, or by providing a further biometric information or by providing a secret information.

These example embodiments allow for an efficient and reliable digital identity management by the user, especially to the software application on the first node.

In preferred embodiments of the present invention, the first identity is formed at least partially by at least one of a digital representation of
  the first biometric information,
  an added further biometric information,
  an added secret information,
  an added certificate.

Additionally or alternatively, the first identity is at least initially formed based on the first biometric information and a consent of the first user to create the first identity. This embodiment ensures that the digital identity is characteristic and includes the required basic information to allow for a safe use of a user's digital identity information: the user's consent to its creation.

In preferred embodiments of the present invention, the denial or approval by the first user of the request of the second user is stored by the software application as one of recorded consents. An overview over at least one of recorded and still open consent requests may be provided to the first user by the software application, allowing the first user to deny, grant or revoke any of the corresponding consents.

This allows for an especially user-friendly management of the digital identities.

In a further preferred embodiment of the present invention, an efficient and trustworthy access control is realized, comprising the steps:
  The first identity corresponding to the first user is created and stored in encrypted form in the identity management system.
  A second identity corresponding to a second user is created and stored in encrypted form in the identity management system.
  A first right to access first information or to access a first software function or to access a first product is assigned to the first identity.

The second user requests an access to the information or the software function or the product from the first user by sending the request to the identity management system.

The identity management system checks the authentication of the second user based on the second identity.

The identity management system sends the request to the first user,

The first user denies or approves the request by responding to the identity management system.

The identity management system (15) checks the authentication of the first user (11) based on the first identity.

Dependent on the check, secret information stored in encrypted form is shared with the second user, whereas the secret information allows the second user to access the information, the software function or the product.

The second user accesses the first information or the first software function or the product.

In the following, example embodiments of the present invention are explained in detail.

DETAILED DESCRIPTION OF EXAMPLE EMBODIMENTS

Digital Identity Management in networks is an important technical challenge. The term identity (short: ID) means a set of attributes related to an entity (ISO29115). A digital ID is a digital representation in binary numbers of an identity. A human identity is the set of human attributes related to a human being (e.g., the human body). Biometrics are human body measurements and calculations (e.g., digital representation in binary numbers of body parts) and can be an effective way to digitally identify one unique human being. Biometrics are data, therefore biometrics can be stored—and stolen. Keeping stored biometric information secure is important to secure the privacy of the corresponding person.

Distributed ledger technology can be used to manage data and—combined with security means—it can be used to manage data in a secure way. For example, a Blockchain system may use an information package carried within a digital block that contains the cryptographic hash of the previous block and a timestamp, validated by a decentralized consensus. Distributed ledger or Blockchain technology can be used to create, store and manage a digital ID.

Figure 1:
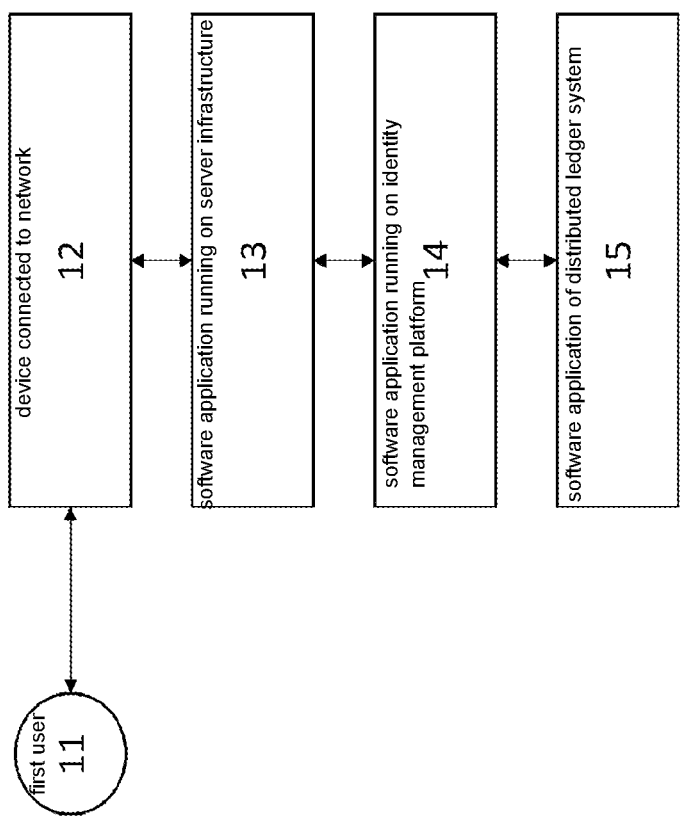
FIG. 1 shows an exemplary system of the present invention to create, store and manage digital identities in a network.

An exemplary system to create, store and manage digital identities in a network is shown in FIG. 1. A user 11 interacts with a device 12, which is connected to a network, e.g. connected to the internet. In a preferred embodiment, device 12 may be a computing device like a mobile computing device (smartphone etc.) with user interface and network interfaces.

To create a digital identity, user 11 uses a software application running on device 12 to provide first biometric information to the software application on device 12. In a preferred embodiment, the first biometric information is provided to the software application by using a sensor of device 12 to measure or record a biometric property, such as an image of human iris, a fingerprint, facial features, a gesture, a voice sample etc.

The used software application of device 12 interacts with software application 13. Software 13 is a software running e.g. on a server infrastructure. Via the software 13 information can be routed in a secure manner from device 12 to other software applications. Software application 13 interacts with software application 14 running on an identity management platform. Identity management platforms are platforms where digital identities and corresponding content stored locally is managed by using software applications running on the hardware of the platform. The first biometric information provided from user 11 to device 12 is securely sent to the software application 14 running on the identity management platform via software application 13 running on a server infrastructure.

Software application 14 of the identity management platform stores a digital representation of the first biometric information on storage means of the identity management platform. Software application 14 interacts with software application 15 of a distributed ledger system. The first biometric information is stored locally and the hashed block of information in a distributed ledger using software application 15. It is stored in encrypted form and constitutes the seed of a newly created digital identity for user 11

If the user 11 wants to a manage his digital identity, e.g. add or remove personal secrets, add or remove further biometric information, approve or deny a request of consent by another user, request consent of another user etc., he may do this by authenticating based on the first biometric information (or subsequently added further biometric information or personal secrets) and sending the corresponding information or request via the software application running on device 12 and software application 13 to software application 14 running on the identity management platform.

Such a request for consent by another user may for example refer to the other user accessing secret information of user 11, or the other user sending information to user 11, or the identity corresponding to user 11 being connected with a second identity corresponding to the other user, or the other user being granted access to control a software application assigned to the identity corresponding to user 11. Generally, consent occurs when one person voluntarily agrees to something. Digital consent is a digital representation in binary numbers of a consent.

A digital identity can now be formed by merging digital consent and biometrics into one distributed ledger identity or Blockchain identity. That means that the biometrics and digital consents form the core of the digital identity. A distributed ledger or Blockchain can store digital identity numbers for hashed digital representations of biometrics and consents. Each digital identity may only contain the necessary biometrics' details and is used only for consented purposes. Biometrics may be stored into a chip (integrated circuit, encapsulated co-processor) with a time stamp.

Consents for specific purposes or requests may be encapsulated with a yes (e.g., digitally "1") or a no (e.g., digitally "0"), so they can be granted, denied and revoked.

Such a digital identity system enables identity tokens, which are special digital identities that can replace accounts (e.g., email+password) and allow user managed access. Using such identity tokens, a network can be used as a cross-consent identity network. Two consents are necessary to create any connection between identities. Accordingly, connections between digital identities are created via human digital consent and stay valid only while the human digital consents are not revoked at one end.

Products or things can have corresponding identities. However, it is provided that these digital identities are dependent on and need to be assigned to at least one digital identity corresponding to an actual human being as base identity. Similarly, company identities can be created as dependent on and assigned to a digital identity of an official representative (e.g. via power of authority consent).

Figure 2:
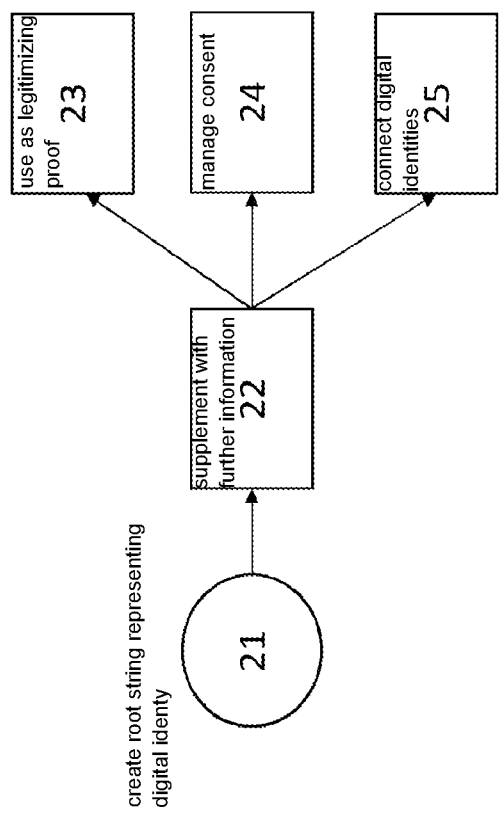
FIG. 2 shows a schematic flowchart of an exemplary method of the present invention for creating and managing a digital identity in a network.

FIG. 2 shows a schematic flowchart of an exemplary method for creating and managing a digital identity in a network.

In a first step 21, a root string representing a digital identity is created. This step starts with an input from a user to a software application running on a user device. The software application requests a first biometric information from the user as well as first consent from the user. This information is used as attributes to create a digital identity as a number or block in a distributed ledger or Blockchain, i.e. a distributed identifier. The software application may request a name for this first identity. In a preferred embodiment, this name is private (i.e. not shared and only on the device). Only the owner of the identity may decide which secret to share with whom. The software application sends the distributed identifier to an identity management platform, which employs distributed ledger technology. The software application also stores the biometric information on the device using local hardware.

The requested consent may refer to a consent to creating a digital identity for the user, the biometric information may be chosen among a selection of different options like measuring or recording an iris sample, fingerprint or palm veins sample, a specific gesture, a voice sample etc.

The creation of a root string representing a digital identity based on a first consent and first biometric information in such a way is secure and fulfills privacy and data protection requirements. To this end, the first consent is digitized by reducing it to a digital string. Then the first biometric information is processed, e.g. in accordance with ISO/IEC JTC 1/SC 37, and added to the digital string representing the first consent. This results in a root string for the digital identity, e.g., compliant with ISO29115. To ensure security, the hashed string representing the digital identity is encrypted. In a preferred embodiment, the digital identity is encrypted by two algorithms, e.g., one classical algorithm (e.g. elliptic curve) and one generating post-quantum keys, preventing future attacks. The encrypted string is stored as digital identity in the distributed ledger, e.g., Blockchain, on a hardware memory of the identity management platform.

Using such a method for creating and managing a digital identity, a technical system is provided which fulfills data protection requirements for consents like:
prominent and separate (easy to understand, plain/clear language)
positive opt-in (no pre-ticked, no default on)
specific, different consent for different data
contains the reason (why) and the use (what for)
storage information (how, when/time stamp, exact words)
opt-out as simple as opt-in Once, the digital identity is created using the root string, it may be supplemented in a second step 22 by providing further information like further biometric information or personal secrets, for example passwords or authority-dependent information like University diploma, driver license, personal ID, social security number, medical records etc. This information may be used as further attributes to be stored as the digital identity and therefore making the digital identity stronger.

The information stored with or as part of the digital identity may then be used as legitimizing proof in step 23. It may for example be used to verify this information to other users in the network or to authenticate to other users or network nodes or to access other network nodes or to log in to applications or services in the network.

To use information or secrets stored with or as part of the digital identity, the software application running on the user device receives input representing a request, e.g.:
a request by the user to access an online service,
a request for authorization for login by an online service,
a request for legitimizing proof (e.g. a certain qualifying age or the possession of a certain document like a driver's license) by an online service
a request by a federated identity service, e.g. openID, a request by a user-managed access service, e.g., oAUTH.

The software application accesses the digital identity to check the consent for such an action and to check whether the necessary information is stored with or as part of the digital identity. If consent and information are stored and valid, the software application creates a token, which includes only the required and consented secrets for this specific action. Therefore, the token is a bundle of information the user want or agreed to share with the specific requester. If there is no consent information stored for this action, the software application may ask the user for consent. If the requested or necessary information is not stored, the software application may ask the user to create and store it. Finally, the software application shares the token with the requester.

Therefore, one piece of secret information and one piece of consent are bundled into one token to be used as an information package able to fulfill a request for legitimizing proof or for authorizing information. This token is used to share the minimum needed information.

In an alternative or subsequent step 24, the user may manage consent using his created digital identity. To this end, the software application on the user device receives and stores an answer from the user to each specific consent request: yes or no (e.g. stored as 1 or 0). The software application can create a backlog of requests and enable its user to answer at any possible time.

For example, such a request may be a question "Do you consent to user A/service B/company C sending you newsletters with the conditions . . . ?". Such a question could be triggered by the user himself or by the party asking for consent, i.e. user A, service B or company C.

In a preferred embodiment, the software application checks, whether the question/conditions of the consent are compliant with predetermined data protection or privacy requirements, e.g. limit date or revocation option.

In a preferred embodiment, the software application automatically suggests questions on related categories of requests to expand the given consent setup. It may also support with reminders in revoking, revalidating, re-consenting to enable secret sharing. Such a functionality can be extended with existing machine learning algorithms to form an assistant to ask the questions and keep the support manageable (reminding about expired consents or time limits of already existing consents, etc.).

In a preferred embodiment, the software application can show a summary of or an overview over all or selected consents to the user. Core functionality of such an overview or consent dashboard is keeping the consent management practical for the user, e.g., by using the following rules:

all consents are created answering a question with yes or no accordingly the consents are visualized as yes or no all consents can be granted, denied, revoked, re-granted, revoked again etc. with a single action.

In an alternative or subsequent step 25, digital identities can be connected, e.g., newly created digital identity based on newly created root strings can be connected. To this end, the software application on the user device asks for consent to establish one-to-one connections between first identities. For that, the software application creates distributed identifiers, e.g. including distributed identifiers to object or smart products the user owns. This creation of distributed identifiers only happens after according consent by the user to the software application. In a preferred embodiment, all distributed identifiers are listed (replicated) as attributes in the user's digital identity.

In order to connect existing root strings, for example a third root string can be generated hashing the two existing root strings. This third root string can be replicated as a secret of the original two root strings in each consent dashboard. These two root strings can deny on both sides the existing third root string. Any number of secondary strings can be created via consent of one root string. All these secondary strings are connected to the one root string via this consent.

All one-to-one connections including identities for objects or smart products are only valid while the base digital identity consents at both ends are still valid.

One-to-one connection can be used to share secrets or to create a smart contract, e.g. by using two base identities corresponding to human users to generate a distributed identifier for the smart contract and confirm the agreement between the two identities.

Figure 3:
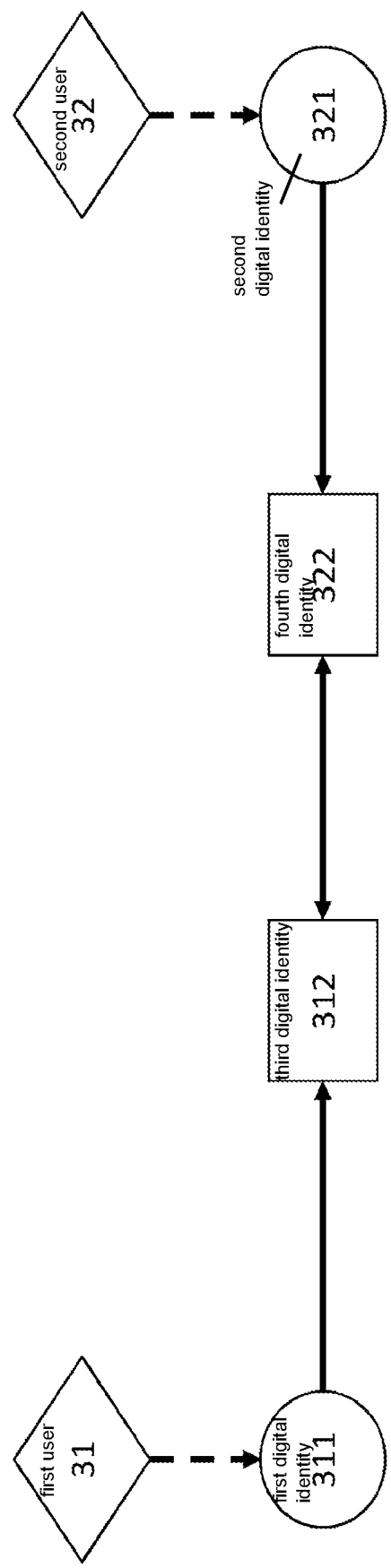
FIG. 3 shows an example for the interaction of users in a network using their digital identities, in accordance with an example embodiment of the present invention.

In FIG. 3, an example for the interaction of users in a network using their digital identities is shown. A first digital identity 311 is created based on a root string created by merging information received by a first user 31, whereas the information includes a first consent and a first secret like a biometrical information. A second digital identity 321 is created based on a root string created by merging information received by a second user 32, whereas the information includes a first consent and a first secret like a biometrical information. A third digital identity 312 is created for example for a product, in this example for a car belonging to the user 31. Digital identity 312 is connected to and dependent on the first digital identity 311. The creation of the third digital identity is possible only after the consent of user 32 provided via the first digital identity 311. A fourth digital identity 322 is created for example for a product, in this example for a garage belonging to the user 32. Digital identity 322 is connected to and dependent on the second digital identity 321. The creation of the fourth digital identity is possible only after the consent of user 32 provided via the second digital identity 321.

The third digital identity, corresponding to the car belonging to user 31, and the fourth digital identity, corresponding to the garage belonging to user 32, can include consents to action provided by the respective owner of the products. Such consents may include the consent to certain conditions of a smart contract automatically negotiated between products. For example, user 31 may consent to the car negotiating a smart contract with a garage with a maximum fee per parking time as well as negotiation strategy or format and user 32 may consent to the garage negotiating a smart contract with a car with a minimum fee per parking time as well as negotiation strategy or format. Within these consented conditions, the products may now negotiate a smart contract on their own, for example allowing the car to park in the garage (including the opening of the garage door) for a negotiated parking fee. In alternative embodiments, the consent to the conditions for the negotiation or the consent to making negotiations at all may not be given in advance, but requested from the users by their products via the respective digital identities in the digital identity management system.

The invention claimed is:

1. A computer-implemented method to secure an interaction between at least two users in a network, at least two network nodes being connected via the network, the method comprising the following steps:

connecting by a first user to the network via a first network node of the two network nodes;

creating in the network, by the first user, a first identity corresponding to the first user via a software application running on the first network node, the creation including the first user providing first biometric information characterizing the first user;

storing the first biometric information in encrypted form by a computer-implemented identity management system;

accessing the network, by a second user, via a second network node of the two network nodes;

requesting, by the second user, via the network, consent of the first user to:
(i) the second user accessing secret information of the first user, or
(ii) the second user sending information to the first user, or
(iii) the first identity corresponding to the first user being connected with a second identity corresponding to the second user, or
(iv) the second user being granted access to control a software application assigned to the first identity, wherein the request is sent via the identity management system; and, denying or approving the request of the second user, by the first user, via the software application running on the first network node, wherein the first identity is at least initially formed by merging the first biometric information and a digital representation of the consent of the first user to create the first identity, and wherein the merging involves merging the first biometric information and the digital representation of the consent into a distributed ledge identity or a Blockchain identity.

2. The method according to claim 1, further comprising:

authenticating by the first user to the identity management system by providing the first biometric information via the software application running on the first network node; and after the authentication, altering, by the first user, the first identity or information stored with the first identity corresponding to the first user, via the software application running on the first network node, the altering including:
(i) adding or removing further biometric information corresponding to the first user, or
(ii) adding or removing secret information, or
(iii) adding or removing a certificate.

3. The method according to claim 1, wherein the first identity is formed at least partially by at least one of a digital representation of:

(i) the first biometric information, and/or
(ii) an added further biometric information, and/or
(iii) an added secret information, and/or
(iv) an added certificate.

4. The method according to claim 1, wherein to deny or approve the request, the first user authenticates to the identity management system by again providing via the software application the first biometric information or by providing a further biometric information or by providing a secret information.

5. The method according to claim 1, wherein the first biometric information includes at least one of an iris sample of the first user, or a fingerprint sample of the first user, or a palm veins sample of the first user, or a specific gesture of the first user, or a voice sample of the first user.

6. The method according to claim 1, wherein the denial or approval by the first user of the request of the second user is stored by the software application as one of recorded consents.

7. The method according to claim 6, wherein an overview over at least one of recorded and still open consent requests is provided to the first user, and one of the requests can be accessed by the first user to deny, grant or revoke the corresponding consent.

8. The method according to claim 1, wherein the first identity corresponding to the first user is created and stored in encrypted form in the identity management system, and the method further comprises:
  creating a second identity corresponding to the second user, and storing the second identity in encrypted form in the identity management system;
  assigning to the first entity a first right to access first information or to access a first software function or to access a first product;
  requesting by the second user an access to the first information or the first software function or the first product from the first user by sending the request to the identity management system;
  checking by the identity management system authentication of the second user based on the second identity;
  sending by the identity management system the request to the first user;
  denying or approving the request of the second user, by the first user, by responding to the identity management system;
  checking, by the identity management system, authentication of the first user based on the first identity; dependent on the check of the authentication of the first user, sharing secret information stored in encrypted form with the second user, the secret information allowing the second user to access the first information, or the first software function or the first product;
  accessing by the second user the first information or the first software function or the first product.

9. A non-transitory computer-readable storage medium on which is stored a computer program to secure an interaction between at least two users in a network, at least two network nodes being connected via the network, the computer program, when executed by a computer, causing the computer to perform the following steps:
  connecting by a first user to the network via a first network node of the two network nodes;
  creating in the network, by the first user, a first identity corresponding to the first user via a software application running on the first network node, the creation including the first user providing first biometric information characterizing the first user;
  storing the first biometric information in encrypted form by a computer-implemented identity management system;
  accessing the network, by a second user, via a second network node of the two network nodes;
  requesting, by the second user, via the network, consent of the first user to:
    (i) the second user accessing secret information of the first user, or
    (ii) the second user sending information to the first user, or
    (iii) the first identity corresponding to the first user being connected with a second identity corresponding to the second user, or
    (iv) the second user being granted access to control a software application assigned to the first identity, wherein the request is sent via the identity management system; and
  denying or approving the request of the second user, by the first user, via the software application running on the first network node, wherein the first identity is at least initially formed by merging the first biometric information and a digital representation of the consent of the first user to create the first identity, and wherein the merging involves merging the first biometric information and the digital representation of the consent into a distributed ledge identity or a Blockchain identity.

* * * * *